(12) United States Patent
Fiordaliso et al.

(10) Patent No.: US 8,308,590 B2
(45) Date of Patent: Nov. 13, 2012

(54) HUB-PULLEY ASSEMBLY HAVING A ROTATIONALLY DISENGAGEABLE PULLEY

(75) Inventors: Carlo Fiordaliso, Citta'Sant'Angelo (IT); Alberto Ruffini, Chieti Scalo (IT)

(73) Assignee: Dayco Europe S.r.l., Chieti (IT)

( * ) Notice: Subject to any disclaimer, the term of this patent is extended or adjusted under 35 U.S.C. 154(b) by 891 days.

(21) Appl. No.: 12/087,572

(22) PCT Filed: Jan. 10, 2006

(86) PCT No.: PCT/IT2006/000007
§ 371 (c)(1),
(2), (4) Date: Nov. 21, 2008

(87) PCT Pub. No.: WO2007/080607
PCT Pub. Date: Jul. 19, 2007

(65) Prior Publication Data
US 2009/0305830 A1    Dec. 10, 2009

(51) Int. Cl.
*F16H 55/36* (2006.01)
(52) U.S. Cl. ............... 474/166; 474/902; 464/24
(58) Field of Classification Search .......... 474/166, 474/199, 902; 192/58.4, 58.41; 464/2, 10, 464/24, 30, 89
See application file for complete search history.

(56) References Cited

U.S. PATENT DOCUMENTS

| | | | |
|---|---|---|---|
| 2,855,079 A | 10/1958 | Spase | |
| 4,050,559 A * | 9/1977 | Andrews et al. | 192/58.4 |
| 4,653,616 A * | 3/1987 | Mizusawa | 188/290 |
| 4,852,424 A * | 8/1989 | Grassmuck et al. | 464/68.3 |
| 5,140,868 A * | 8/1992 | Mizuno et al. | 474/166 |
| 5,377,962 A | 1/1995 | Ochs et al. | |

FOREIGN PATENT DOCUMENTS

| | | |
|---|---|---|
| EP | 1544435 | 6/2005 |
| JP | 9287647 | 11/1997 |
| WO | WO 2005012765 A1 * | 2/2005 |

OTHER PUBLICATIONS http://answers.yahoo.com reference.*
*Viscosity, Relaxation, and Stability of Natural Rubber by Jiri Malac.*
European Search Report mailed Jan. 31, 2011 in European Application No. EP10161693.6-2421.

* cited by examiner

*Primary Examiner* — Michael Mansen
*Assistant Examiner* — Juan Campos, Jr.
(74) *Attorney, Agent, or Firm* — Davidson Berquist Jackson Berquist, LLP (57) ABSTRACT

A hub-pulley assembly comprising a hub adapted to be connected to a rotational member of a motor vehicle and having an axis, a pulley adapted to cooperate with a drive belt and driving means arranged between the hub and the pulley. The driving means comprise bidirectional disengagement means which allow a relative rotation between the hub and the pulley in both directions.

13 Claims, 6 Drawing Sheets

Median Plane

HUB-PULLEY ASSEMBLY HAVING A ROTATIONALLY DISENGAGEABLE PULLEY

TECHNICAL FIELD

The present invention relates to a hub-pulley assembly having a pulley rotationally disengageable from the hub, particularly for an accessory drive of a motor vehicle.

BACKGROUND ART

An accessory drive generally comprises a drive pulley connected to a crankshaft of an internal combustion engine of the motor vehicle, at least a second and a third pulley respectively connected to an alternator and to an accessory, for example a hydraulic pump, and a belt for connecting the pulleys together.

During the cranking step, until combustion reaches a steady condition and the crankshaft is driven by a starter motor, combustion irregularities which induce a fluctuating torque on the drive occur.

Such fluctuating torque interacts with the inertia of the accessories rotationally driven by the drive, and in particular with that of the alternator which is the accessory with the highest inertia. The consequent stresses may prejudice the belt duration; this problem is particularly felt in motor vehicles of recent production, in which the electrical absorption is always higher and consequently larger, more powerful alternators are needed.

Hub-pulley assemblies having a rotationally disengageable pulley are known comprising a hub rigidly connected to the alternator shaft, a pulley fed by the accessory drive belt and a torsional disengaging device arranged between the pulley and the hub, to disengage the alternator when the speed of the alternator shaft exceeds the speed of the pulley.

In particular, the known torsional disengaging devices comprise for example a helical spring having an end portion rigidly connected to the pulley and an engaging portion having a plurality of turns wound about a cylindrical surface integral with the hub.

The spring is wound in a direction so that, when the pulley tends to exceed the angular speed of the hub, the turns are tightened about the cylindrical surface and generate a friction torque which rigidly engages the pulley and the hub.

On the contrary, when the angular speed of the alternator shaft tends to exceed that of the pulley, the turns of the spring tend to disengage from the cylindrical surface and allow the relative rotation of the hub with respect to the pulley, to prevent the inertia torque of the alternator from stressing the belt.

Recently, accessory drives have been made comprising a reversible electrical machine working both as a motor during cranking and as an alternator driven by the internal combustion engine.

If the known pulley assemblies were fitted or the shaft of the reversible electrical machine, they would slip during cranking because in such condition the shaft of the reversible electrical machine drives the drive and its rotational speed necessarily tends to exceed that of the pulley. Therefore, the known pulley assemblies cannot be used in combination with a reversible electrical machine.

DISCLOSURE OF INVENTION

It is the object of the present invention to provide a hub-pulley assembly having a rotationally disengageable pulley for use both in drives having an alternator and a separate starter motor and in drives comprising an reversible electrical machine.

The object of the present invention is achieved by a hub-pulley assembly.

BRIEF DESCRIPTION OF THE DRAWINGS

For a better understanding of the present invention, some preferred embodiments will now be described only by way of non-limitative example, and with reference to the accompanying drawings, in which.

BEST MODE FOR CARRYING OUT THE INVENTION

Figure 1:
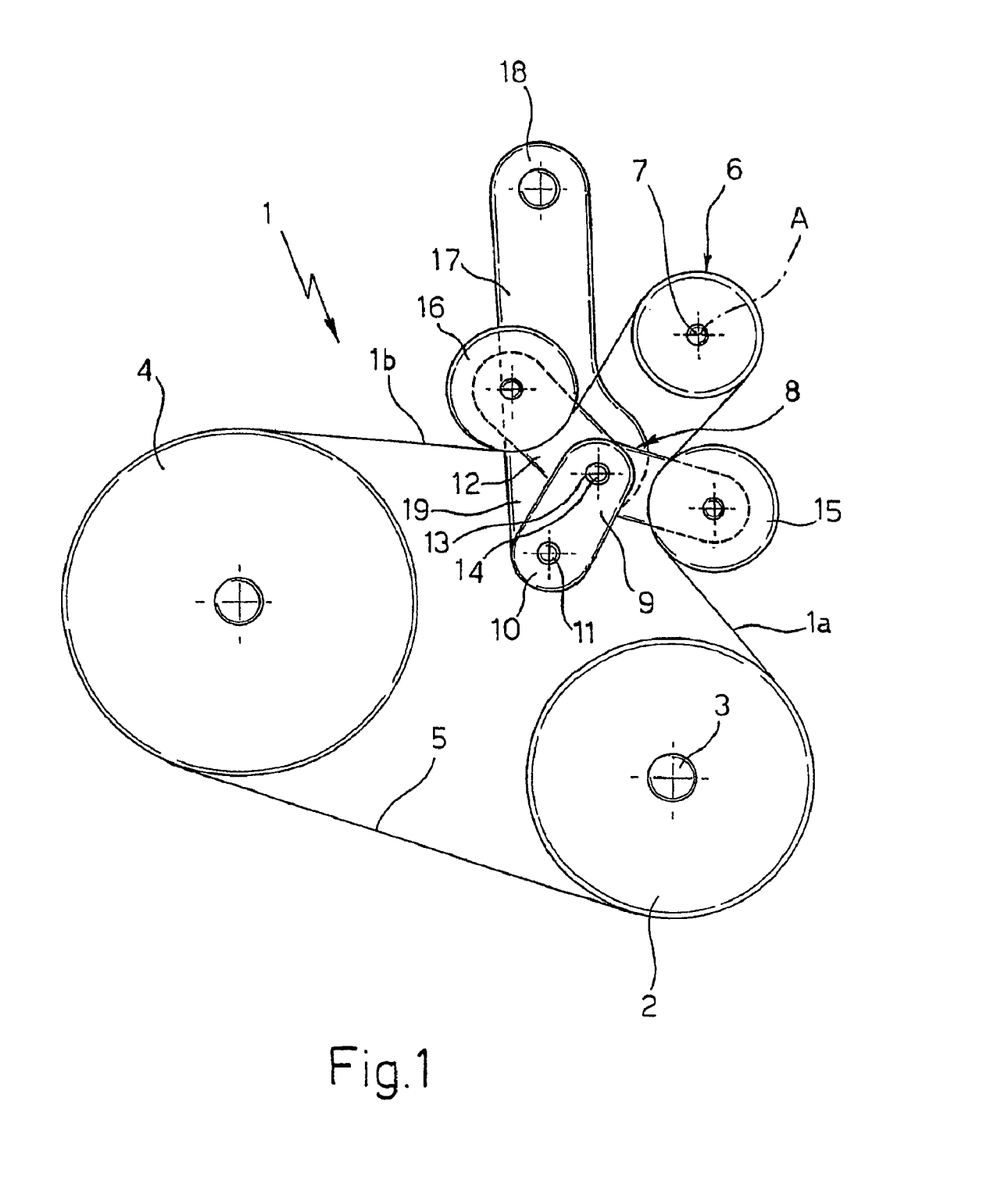
FIG. 1 is a front view of a belt drive comprising a hub-pulley assembly according to the present invention.

FIG. 1 shows an accessory drive 1 comprising a pulley 2 connected to a crankshaft 3 of an internal combustion engine, a pulley 4 connected to an engine accessory, for example a water pump, and a belt 5 for connecting together the pulleys 2, 4 and a hub-pulley assembly 6 connected to a shaft 7 of a reversible electrical machine (not shown).

The reversible electrical machine works as an electrical motor driving the internal combustion engine during the cranking step and works as an alternator for charging an electrical energy accumulator when it is driven by the internal combustion engine.

Preferably, the drive 1 also comprises a tensioner 8 having a connection member 9 provided with an end portion 10 hinged about a fixed pin 11 in use. The tensioner 8 also comprises a rigid arm 12 defining a hole 13 freely and rotationally engaged to a pin 14 carried by an end portion of the connection member 9 opposite the end portion 10, and a pair of idle pulleys 15, 16 carried by the rigid support 12 on opposite sides with respect to the hole 13.

In particular, the pulley 15 cooperates with a run 1a of the drive 1 defined between the pulley assembly 6 and the pulley 2, and the pulley 16 cooperates with a run 1b defined between the pulley assembly 6 and the pulley 4.

The tensioner 8 is supported by an arm 17 having an end portion 18 fastened to a wall of the internal combustion engine, and an end portion 19 longitudinally opposite the former and adjustably connected to the pin 11 to adjust the belt pretensioning 5.

Figure 2:
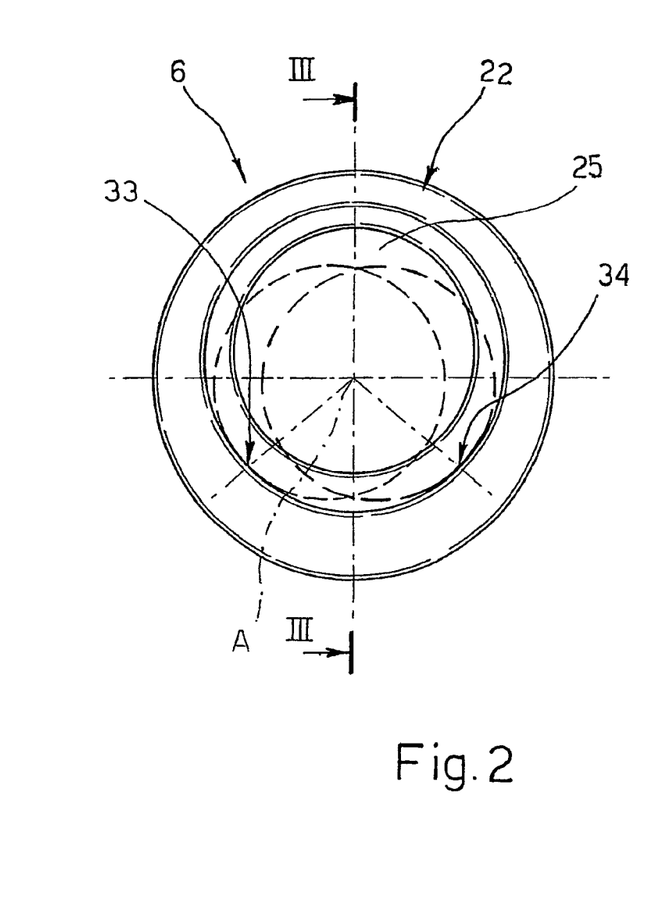
FIG. 2 is a frontal view of a pulley according to the present invention.

FIG. 2 shows a hub-pulley assembly 6 which comprises a hub 21 having an axis A and being adapted to be rigidly connected to the shaft 7 and a crown pulley 22 radially supported on the hub 21 by means of a pair of bearings 23.

Figure 3:
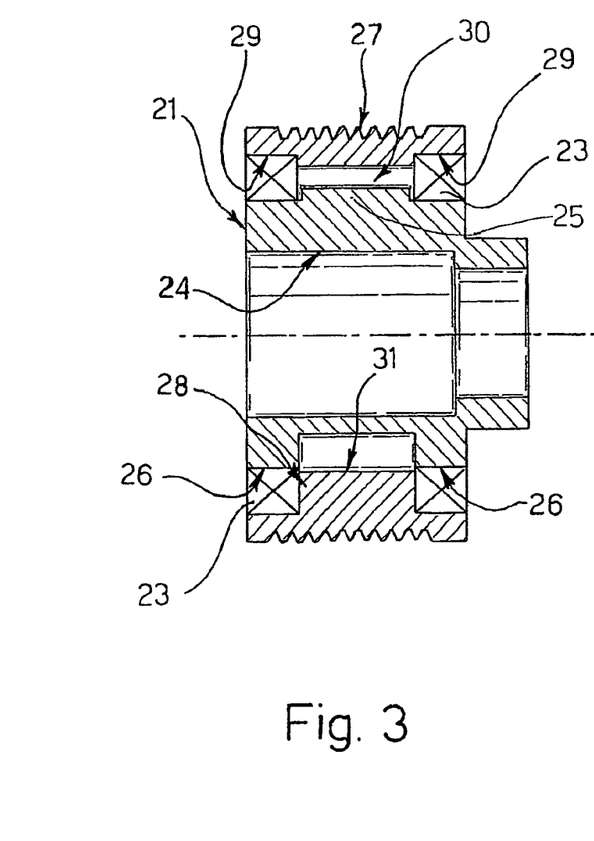
FIG. 3 is a section taken along line III-III in FIG. 2.

In particular, the hub 21 presents a inner hole 24 coaxial with axis A, an axially intermediate offset portion defining a relief 25 protruding from the hub 21 in the radial direction towards the crown pulley 22 and a pair of seats 26 for the respective bearings 23 arranged on parts axially opposite the relief 25.

The crown pulley 22 defines a radially peripheral grooved surface 27 directly cooperating with belt 5, and an inner surface 28 opposite the grooved surface 27 in radial direction and facing axis A.

In particular, the inner surface 28 defines a pair of seats 29 for the bearings 23 symmetrically arranged with respect to the grooved surface 27 and a cavity 30 comprised between the seats 29 along an axial direction and defining a cylindrical surface 31 offset with respect to axis A.

The bearings 23 allow a relative rotation between hub 21 and crown pulley 22 in both directions and, preferably, present radial walls (not shown) for defining a closed volume radially delimited by the hub 21 and the crown pulley 22. In this manner, the cavity 30 is isolated from the impurities of the external environment.

Furthermore, the cylindrical surface 31 accommodates with clearance the relief 25 and defines respective abutting areas 33, 34 arranged on opposite sides with respect to the relief 25.

In particular, the cylindrical surface 31 presents an eccentric 'e' defined so that the difference between the radius of the cylindrical surface 31 and the eccentric 'e' is less than the height of the relief 25. In this manner, the crown pulley 22 is rotationally mobile with respect to the hub 21 between a first and a second stop positions in which the relief 25 circumferentially interferes against the cylindrical surface 31 and is in contact with the abutting area 33 and the stop area 34, respectively.

The operation of the hub-pulley unit 6 is as follows.

When the internal combustion engine is cranked up, the shaft 7 of the reversible electrical machine drives the hub 21 and takes the relief 25 against the abutting area 33 of the cylindrical surface 31. In this manner, the hub 21 and the crown pulley 22 turn in the same direction.

In the following instants, when combustion has not reached a steady state condition, the rotation irregularities of the crankshaft induce a relative movement between the hub 21 and the crown pulley 22.

In particular, when the angular speed of the crown pulley 22 exceeds that of the hub 21, the abutting area 33 and the relief 25 are separated. The maximum rotation of the crown pulley 22 is defined by the contact of the relief 25 against the abutting area 34.

In this manner, the electrical machine is automatically disengaged from the drive 1, thus avoiding the inertia torque from inducing excessive stress on the belt 5.

When the angular speed of the crown pulley 22 decreases with respect to that of the hub 21, the relief 25 returns against the abutting area 33.

Finally, when combustion reaches capacity, the crown pulley 22 is driven by the belt 5, the relief 25 is against the abutting area 34, and the hub 21 and the crown pulley 22 are rigidly engaged and turn in the same direction.

When the drive 1 is connected to an alternator via the pulley-assembly 6, cranking is controlled by a starter motor, the operation is similar to that described above.

Figure 4:
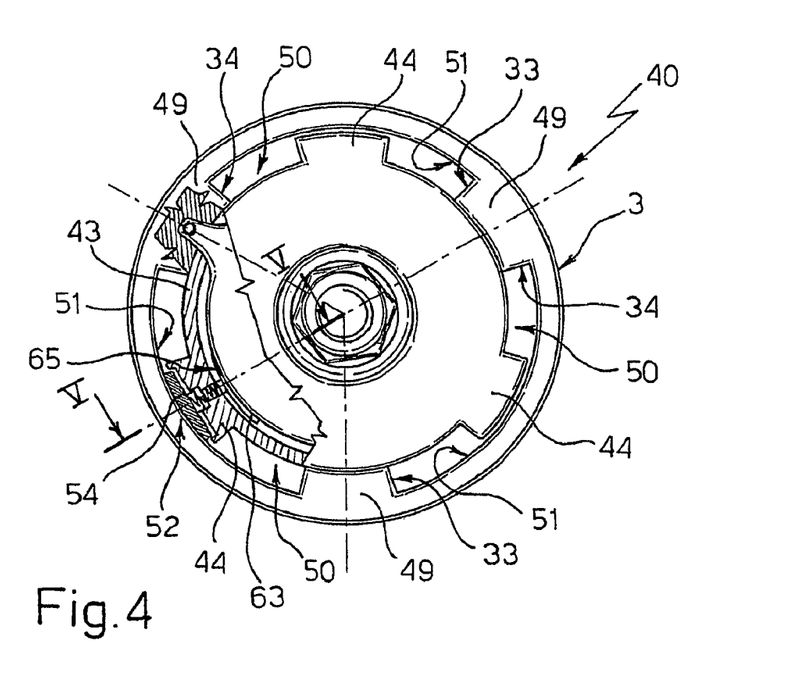
FIGS. 4 and 5 are respectively a frontal view with parts removed for clarity and an axial partial section not in scale taken along line V-V of a second embodiment of the present invention.
Figure 5:
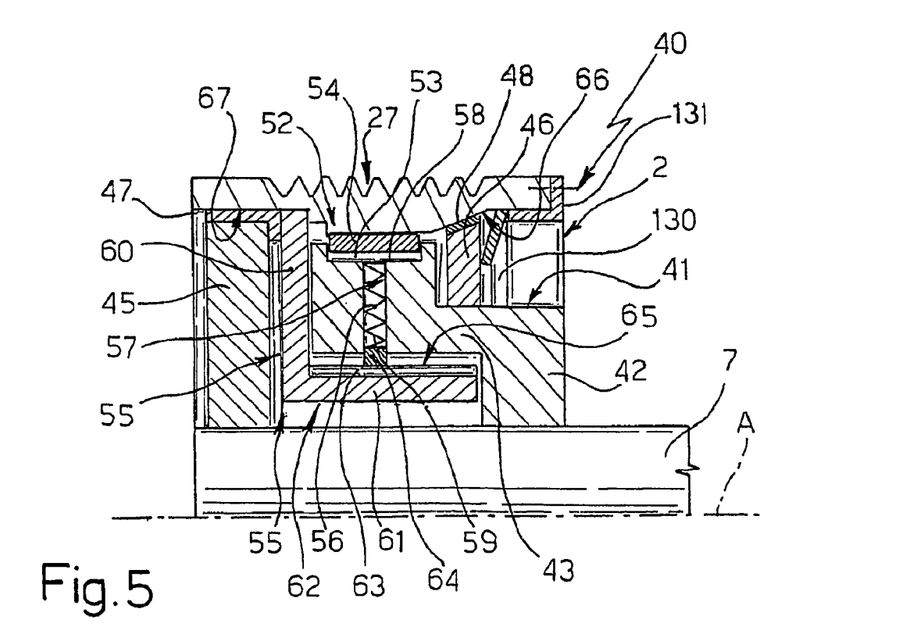

FIGS. 4 and 5 show a hub-pulley assembly 40 in which members similar to those of the hub-pulley assembly 6 are indicated with the same reference numbers.

In the hub-pulley assembly 40, the hub 21 comprises a body 41 essentially cup-shaped having a bottom wall 42 perpendicular to the axis A, a cylindrical wall 43 connected to the bottom wall 42 coaxially to the axis A, and three teeth 44 angularly and equally spaced and protruding radially from the cylindrical wall 43 on the opposite side with respect to axis A.

The crown pulley 22 is radially supported by a first circular crown support 45 rigidly connected to the shaft 7 and a second circular crown support 46 rigidly connected to the cylindrical wall 43.

The supports 45, 46 present respective peripheral rings 47, 48 slidingly cooperating with respective contact surfaces 66, 67 defined by the inner surface 28 coaxially to axis A for radially supporting the crown pulley 22.

In particular, the contact surface 67 is cylindrical and the contact surface 66 is conical.

Preferably, the support 46 is axially mobile and the hub-pulley assembly 40 also comprises a Belleville spring 130 which is pre-loaded against the support 46 by an annular member 131 having a 'L' section and rigidly and adjustably connected to the crown pulley 22.

The crown pulley 22 also comprises three angularly and equally distanced radial relieves 49, extending towards the inside of the inner surface 28 of the crown pulley 22 and axially comprised between the surface contacts 66 and 67. Along a circumferential direction, the abutting areas 33, 34 carried by the radial relieves 49 delimit respective hollows 50 open towards the axis A and radially delimited towards the outside by curved surfaces 51 arranged along a same cylinder of axis A. Each hollow 50 accommodates with clearance a tooth 44 which is mobile between the two stop positions defined by two adjacent radial relieves 49.

Preferably, the hub-pulley assembly 40 further comprises a damping system 52 presenting, for each tooth 44, a guide seat 53 having a radial axis and defined on a head of the tooth 44, and a runner 54 made of friction material sliding inside the guide seat 53.

The damping system 52 also comprises a cam member 55 rigidly connected to the crown pulley 22 and a spring 56 accommodated in a radial hole 57 passing through each tooth 44. Each spring 56 comprises an end portion 58 cooperating with the runner 54 and an end portion 59 opposite to the end portion 58 and cooperating with a cam follower member 64, as specified below, to maintain the runner 54 loaded against the curved surface 51.

In particular, the cam member 55 integrally comprises a flat supporting member 60 perpendicular to axis A and rigidly connected to the radial relieves 49 between the support 45 and the hub 21, and a tubular portion 61 protruding from the flat member 60 towards the bottom wall 42 of the hub 21 and accommodated inside an annular hollow 62 defined between the cylindrical wall 43 and the shaft 7.

The tubular portion 61 accommodates with radial clearance the shaft 7 and defines three radial cams 63 facing the cylindrical wall 43 and cooperating with the respective cam follower members 64, each of which is radially guided by the respective radial hole 57.

Preferably, each cam 63 presents a profile 65 having a radial dimension increasing point by point in accordance with the angular position, for example in a spiral pattern.

In use, each tooth 44 is generally abutting against the respective relief 49 to drive the electrical machine.

When the hub 21 and the crown pulley 22 are relatively moving, the runners 54 frictionally cooperate on the curved surfaces 51 and therefore generate a damping torque acting on the shaft 7 of the reversible electrical machine.

In particular, when the crown pulley 22 turns relatively with respect to the hub 21, the profile 65 moves with respect to the cam follower member 64; in this manner, the load on the spring 56 and the friction torque change.

Preferably, the radial position of the profile 65 increases along a direction opposite to that of rotation of the hub 21, which remains fixed when operating, to obtain an increasing damping when the crown pulley 22 tends to exceed the hub 21. In this manner, the relative speed decreases and engagement occurs gradually.

Figure 6:
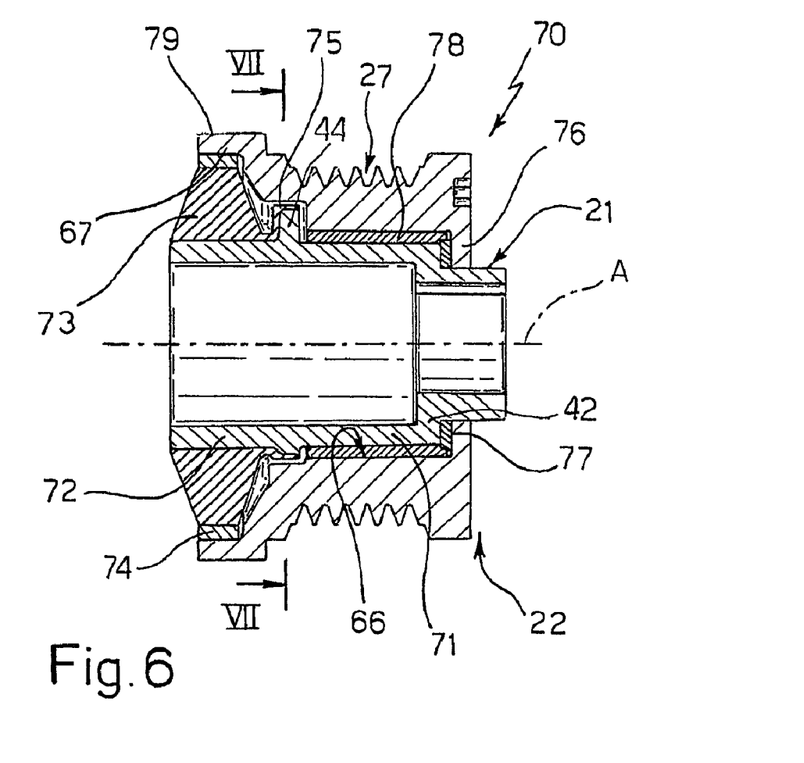
FIGS. 6 and 7 are respectively a diametrical partial section and an axial section taken along line VII-VII in FIG. 6 of a third embodiment of the present invention.
Figure 7:
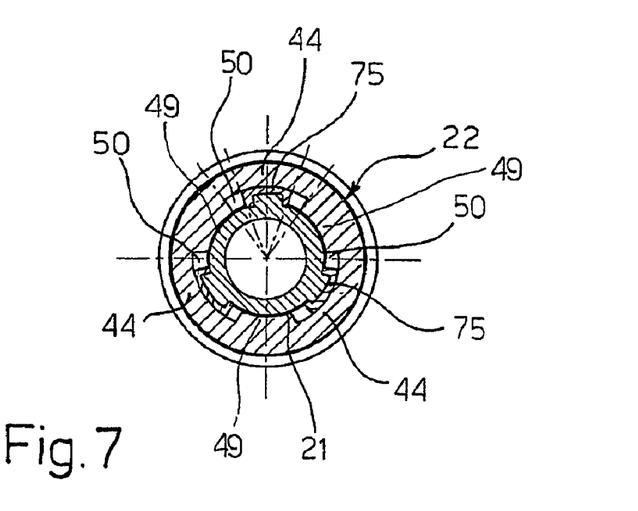

FIGS. 6 and 7 show a hub-pulley assembly 70 in which parts either equal or similar to those described in the hub-pulley assembly 40 are indicated below with the same reference numbers.

In particular, the cylindrical wall 43 defines a first support portion 71 arranged between the bottom wall 42 and the teeth 44, and a second supporting portion 72 arranged on the opposite side of the first supporting portion 71 with respect to the teeth 44.

The damping system 52 of the hub-pulley assembly 70 comprises an annular body 73 made of elastomeric material co-moulded onto the second supporting portion 72, and a friction ring 74 fixedly and peripherally connected to the annular body 73.

In particular, the annular body 73 presents an essentially trapezoidal cross section having a larger base arranged in contact with the supporting portion 72.

According to the embodiment in FIGS. 6 and 7, the teeth 44 are also coated with a damping layer 75 which tends to make uniform the pressure between the teeth 44 and racial relieves 49, thus recovering possible misalignments.

Furthermore, the damping layer 75 is made of elastomeric material and, preferably, is made of one piece with the annular body 73 and during the same co-moulding operation, thus facilitating the manufacturing process.

In order to couple with the previously described hub 21, the crown pulley 22 comprises at a side end a flange 76 facing axis A and cooperating with the bottom wall 42 of the hub 21 via an anti-friction material ring 77. The contact surface 66 is laterally delimited by the flange 76 and presents an axial extension essentially equal to that of the grooved surface 27.

The contact surface 66 is slidingly supported by the first supporting portion 71 via an anti-friction material bushing 78.

The radial relieves 49 and the grooves 50 of the crown pulley 22 are arranged alongside the contact surface 66; at the axial end opposite the flange 76, the cylindrical surface 67 is defined by a collar 79 laterally protruding with respect to the grooved surface 27 and presents a diameter larger than the head diameter of the teeth 44 and the contact surface diameter 66.

The friction ring 74 is interference fitted in the collar 79 and cooperates with the cylindrical surface 67 to generate a friction torque.

Figure 8:
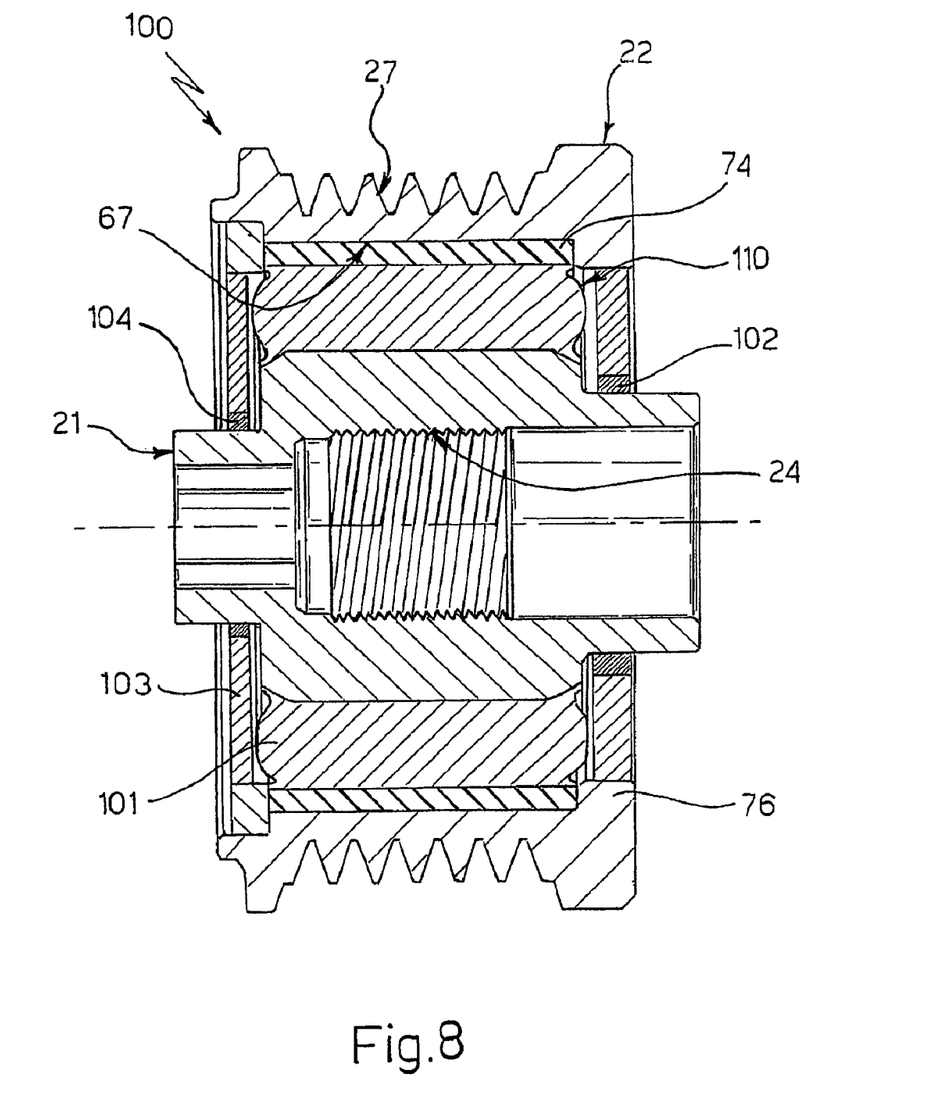
FIG. 8 is an axial section of a fourth embodiment of the present invention.

According to a further embodiment, shown in FIG. 8, a hub-pulley assembly 100 comprises the hub 21, the crown pulley 22, and a friction device 110 presenting an annular body 101 made of elastomeric material co-moulded onto the hub 21 and the friction ring 74 radially interference fitted against the cylindrical surface 67.

Furthermore, the axial position of the friction ring 74 is defined on one side by the flange 76 cooperating with the hub 21 by means of a bronze bearing 102 and on the other by a closing lid 103 rigidly connected to the crown pulley 22 and cooperating with the hub 21 by means or a second bronze bearing 104.

In this case, the pulley 22 is radially supported by means of the bronze bearings 102, 104 and is frictionally connected to the hub 21 in the circumferential direction. The stop positions, in which the friction ring 74 and the crown pulley 22 are reciprocally integral, are determined according to the balance of the rotation between the algebraic sum of the torques acting on the hub 21 and on the pulley 22 respectively, and the reaction torque due to the elastic deformation of the annular body 101.

Furthermore, when a maximum torque transmissible by friction is exceeded, the crown pulley 22 slips with respect to the friction ring 74 both in one direction and in the other, allowing a relative movement for values higher than 360°.

Furthermore, the hole 24 of the hub-pulley assembly 100 is internally threaded and presents an end with a transversal hexagonal section. In this manner, the hub-pulley assembly 100 may be directly fastened to an output shaft of the alternator by means of an automatic screwdriver.

Figure 9:
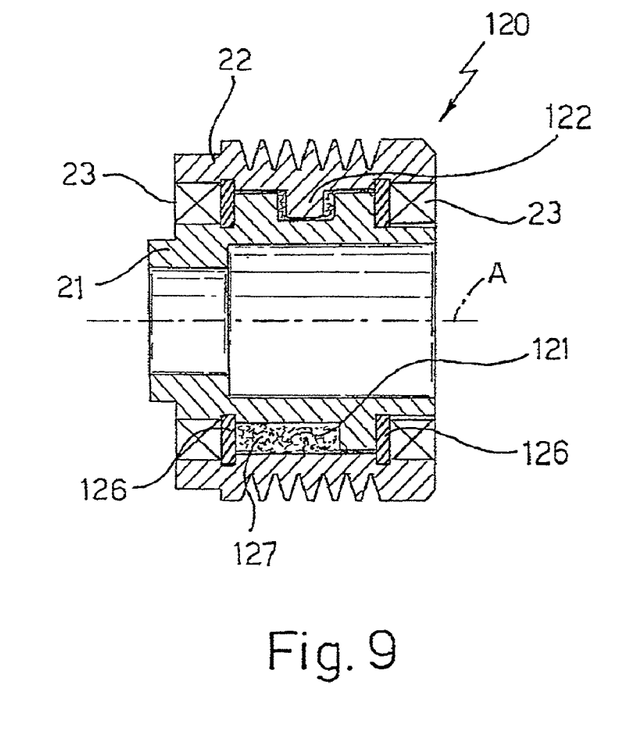
FIG. 9 is an axial section of a fifth embodiment of the present invention.
Figure 10:
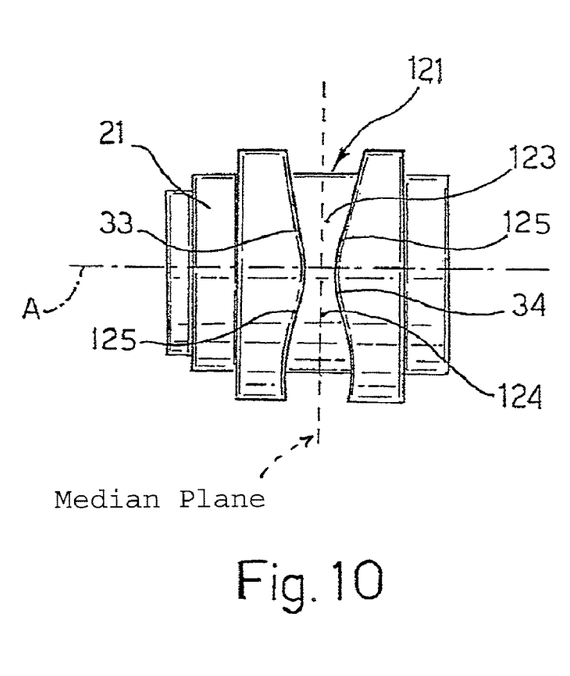
FIG. 10 is a side view of the hub-pulley assembly in FIG. 9 with components removed for clarity.

FIG. 9 shows a pulley assembly 120 in which the hub 21 defines an annular hollow 121 housing a radial tooth 122 carried by the crown pulley 22 and protruding from the cylindrical surface 31 towards the axis A. The annular hollow 121 presents along the circumferential direction a first reduced width zone 123 defining the abutting area 33, an intermediate zone having a width so as to allow the free movement of the radial tooth 122 and a second reduced width zone 124 defining the abutting area 34.

In particular, along reduced width zones 123, 124, the annular hollow 121 presents side walls 125 having a converging profile towards a median plane of the groove 121 itself.

The hub 21 also defines in an intermediate angular position between the reduced width zones 123, 124, an axial groove 127 (shown in section in FIG. 9) crossing the annular hollow 121 and having a width so as to allow the passage of the radial tooth 122 during the assembly of the crown pulley 22 on the hub 21.

Furthermore, the cavity 30 is filled with a viscous material (shown with dotted hatching in FIG. 9) and, for this purpose, is laterally closed by two seals 126 which are axially blocked against the hub 21 by the bearings 23.

The viscous material is preferably a paste comprising a polytetrafluoroethylene based polymer powder, graphite and a liquid or semisolid halogenated poly ether based lubricating material, for example KRYTOX®. The object of using a viscous material is to dampen the oscillations and to lubricate the abutting areas 33, 34, thus preventing the radial tooth 122 from restraining due to the high contact forces with the side walls 125, which are converging. Preferably, the viscosity of the viscous material is high to increase damping and to simplify the oil seals 126. Conveniently, the viscosity of the viscous material is comprised between 10 and 30 and preferably equal to approximately 16 (values obtained using the Mooney ML (1+4) test method at 50° C.).

The advantages that the pulley assemblies described above allow to obtain are as follows.

The hub-pulley assemblies 6, 40, 70, 100, 120, thanks to the fact that the hub 21 and the crown pulley 22 are bidirectionally disengaged and may turn in either direction of rotation, may be used both with a reversible electrical machine and with an alternator, allow the disengagement thereof during cranking when the speed of the crown pulley 22 tends to exceed the speed of the hub 21. Tension peaks on the belt during cranking are thus reduced.

Furthermore, the fact that in both stop positions the hub 21 reaches an end of stroke position with respect to the crown pulley 22 allows the rotationally connection of the alternator shaft or of the reversible electrical machine during cranking by the internal combustion engine.

The use of a single cam relief 25 allows to reach a high maximum relative movement value ensuring a longer disengagement of the reversible electrical machine or the alternator.

The use of a plurality of teeth allows the hub 21 to be balanced more simply.

The damping layer 75, which may also be envisaged in all embodiments, makes uniform the contact pressure and dissipates the energy of knocks making the operation of the hub-pulley assembly more silent.

The damping system 52 allows to dampen the oscillations and to further decrease the tension peaks.

The hub 21 and the crown pulley 22 have relatively contained movements which allow the use of sliding supporting members thus reducing production costs. Furthermore, the sliding supports may be coated with a friction layer to increase oscillation damping when required in specific applications.

Furthermore, the tensioner 8 comprising the rigid arm 12 tends to cause high tensions in the belt 5 during the cranking transients. It has been verified that the use of the tensioner 8 in combination with the pulley assembly 6 or one of the previously described embodiments, allows to decrease the value of such tensions.

The use of at least one conical coupling surface between the supports 45, 46 allows to obtain a precise centring of the crown pulley 22 on the hub 21. Furthermore, the Belleville spring 130 allows to recover the clearance.

It is finally apparent that changes and variations can be made to the hub-pulley assemblies here described and illustrated without departing from the scope of protection of the present invention, as defined in the accompanying claims.

In the embodiment of FIGS. 4 and 5, the curved surfaces 51 may present a spiral profile. In this case, the use of a cam member 55 and of the cam follower member 64 is not needed to be envisaged; the radial hole 57 is blank and the variable damping is due to the relative motion of the runner 54 on the curved surface 51 having a spiral profile. Furthermore, the profile of the curved surfaces 51 and of the radial cams 63 may generally present a point by point variable radial dimension to obtain different damping laws. For example, the profile may present two appropriately joined and converging ramps in a maximum point.

The hub-pulley assemblies 6, 40, 70, 100, 120 may be connected to any of the rotating members driven by the accessory drive, for example a crankshaft, in order to allow a temporarily disengagement.

Preferably, the hub-pulley assemblies 6, 40, 70, 100, 120 are used in an accessory drive comprising a tensioner provided with the rigid supporting member 12 carrying the idle pulleys 15, 16 but may also be used in combination with an automatic tensioner having a single pulley.

The hole 24 may be threaded and present a seat for a fastening tool in all embodiments.

It is possible that in each embodiment the ball bearings are replaced by sliding supports.

The invention claimed is:

1. A pulley-hub assembly comprising a hub adapted to be connected to a rotational member of a motor vehicle and having an axis (A), a pulley adapted to cooperate with a drive belt, at least one relief member radially arranged with respect to said axis (A) and carried by one of said hub and pulley, and a bidirectional disengagement structure which allow a relative rotation between said hub and said pulley in both directions, wherein said bidirectional disengaging structure comprises at least a first abutting area and a second abutting area carried by the other of said hub and pulley and spaced in a circumferential direction to delimit a respective hollow space accommodating with circumferential clearance said at least one relief member, said first abutting area defining a first stop position in which said hub and said pulley are coupled in a first direction of rotation, and said second abutting area defining a second stop position in which said hub and said pulley are coupled in a second direction of rotation opposite said first direction of rotation, said hub-pulley assembly further including a viscous friction material contained inside said hollow space and cooperating between said hub and said pulley.

2. The pulley-hub assembly as in claim 1 further including a bearing provided on each opposing side of the pulley and between the hub and pulley and positioned outboard of and axially blocking radially extending seals provided on opposing sides of the hollow space and between the hub and pulley.

3. The pulley-hub assembly as in claim 1 wherein said at least one relief member comprises a radially extending tooth.

4. The pulley-hub assembly as in claim 3 wherein said radially extending tooth extends from said pulley.

5. The pulley-hub assembly as in claim 1 wherein said at least one relief member engages said first or second abutting area to thereby couple the hub and pulley together in one of said first or second directions of rotation.

6. The pulley-hub assembly as in claim 1 wherein the viscous friction material comprises a paste material.

7. The pulley-hub assembly as in claim 1 wherein the paste material comprises a polytetrafluroethylene based polymer powder, graphite and a liquid or semisolid halogenated polyether based lubricating material.

8. The hub-pulley assembly according to claim 1, wherein said hollow space is an area formed around a portion of the outer periphery of said hub and is defined between opposing side walls each of which include a portion having an inwardly converging profile forming said first and second abutting areas narrowing the width of said hollow space.

9. The hub-pulley assembly according to claim 8, wherein said hollow space is annular and the abutting areas interact with the relief member.

10. The hub-pulley assembly according to claim 1, wherein said hollow space is closed with respect to the external environment by means of said hub, said pulley and at least one closing member positioned there between.

11. The hub-pulley assembly according to claim 1, wherein said friction material has a viscosity from 10 to 30 according to the Mooney ML (1+4) test method at 50° C.

12. An accessory drive for an internal combustion engine, comprising a first pulley adapted to be connected to a crankshaft of the engine, a second pulley adapted to be connected to a reversible electrical machine and a third pulley adapted to be connected to an accessory, a belt wound about said first, second and third pulleys, and a tensioner cooperating with said belt and comprising a support arm adjustably mounted to the engine at a first end, an end of a first arm is pivotally mounted at a second end of the support arm, and an opposite end of the first arm pivotally supports a rigid arm having first and second idle pulleys mounted at respective opposite ends thereof, the first idle pulley cooperating with a first branch of said belt defined between said first and second pulleys, and the second idle pulley cooperating with a second branch of said belt comprised between said second and third pulleys, wherein at least one of said first, second and third pulleys is a hub-pulley assembly according to claim 1.

13. The drive according to claim 12, wherein said tensioner comprises a mobile rigid arm supporting said first and second idle pulleys.

* * * * *